No. 660,564. Patented Oct. 30, 1900.
C. W. DE MOOY.
REVERSING GEAR AND CLUTCH COMBINED.
(Application filed Sept. 28, 1899.)
(No Model.)
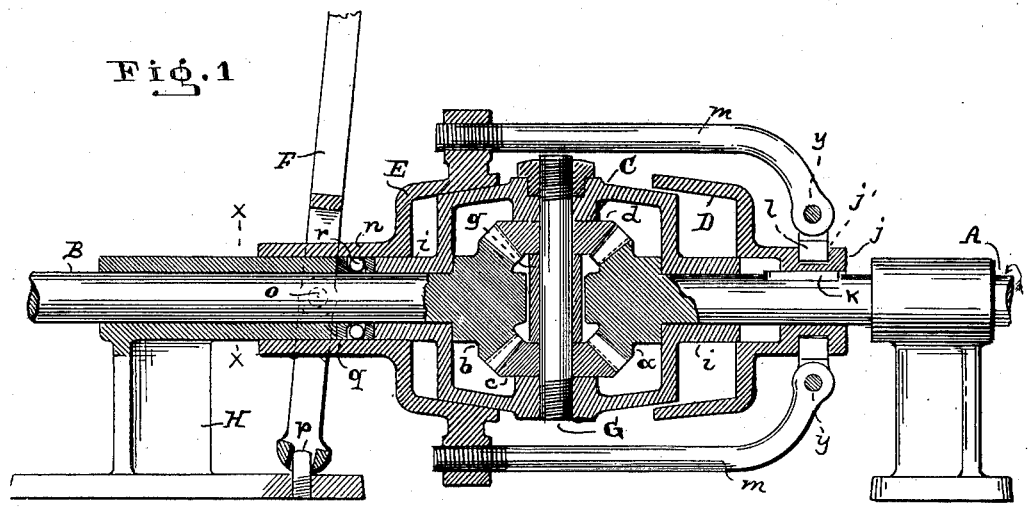
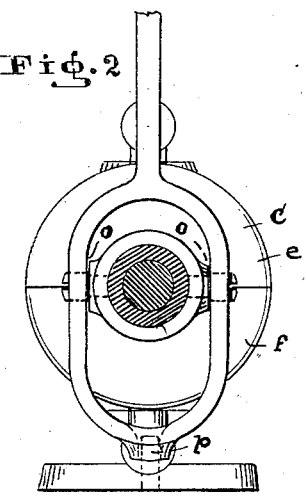
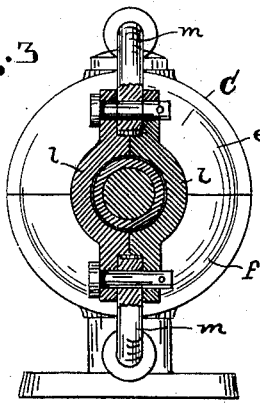
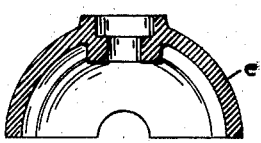
WITNESSES
INVENTOR
Chas. W. De Mooy.
By B. F. Eibler, Attorney

UNITED STATES PATENT OFFICE.

CHARLES W. DE MOOY, OF CLEVELAND, OHIO.

REVERSING-GEAR AND CLUTCH COMBINED.

SPECIFICATION forming part of Letters Patent No. 660,564, dated October 30, 1900.

Application filed September 28, 1899. Serial No. 731,987. (No model.)

*To all whom it may concern:*

Be it known that I, CHARLES W. DE MOOY, a citizen of the United States of America, and a resident of Cleveland, in the county of Cuyahoga and State of Ohio, have invented certain new and useful Improvements in Reversing-Gear and Clutch Combined, of which the following is a specification.

My invention relates to improvements in means for driving line-shafting, &c., in either direction; and the objects of my improvements are, first, to provide a mechanism which is not subject to wear in its ordinary use—namely, that of transmitting motion from one shaft to another in the same direction—second, to construct such mechanism in a compact and reliable manner which admits of a convenient manipulation for reversing the motion of the driven shaft, and, third, to provide facilities whereby an inert condition can be obtained of the driven shaft while the driving-shaft is in motion. I attain these objects in a mechanism constructed substantially as illustrated in the accompanying drawings, in which—

Figure 1 represents a longitudinal central sectional view of said mechanism. Fig. 2 is a transverse sectional view on line $x\,x$, Fig. 1; and Fig. 3 is a transverse sectional view on line $y\,y$, Fig. 1. Fig. 4 represents a part of this driving mechanism detached.

Like letters of reference denote like parts in the drawings and specification.

As shown, the contrivance substantially consists of a driving-shaft A and a driven shaft B, a nest of miter-gears $a\,b\,c\,d$, a cone-casing C, cone-cups D E, and a lever F. The shafts are provided with the gearings $a\,b$, while the gears $c\,d$ are carried in mesh with the first-named gears upon the spindle G, which extends transversely through casing C. The casing proper comprises the halves $e\,f$, which are adapted for reception of the gears, the spindle G, and a journaled connection upon the shafts A B. The circular part of these halves is conical in each direction to enable of a friction connection with the cups D E. The spindle G is preferably arranged at right angles to the joining faces of the halves $e\,f$ for connection of same and reception of the gears in the manner as shown. A sleeve $g$ is placed upon the spindle G simply for the purpose of retaining the gears at or in proper engagement. The cups D E are adapted to slide upon the hubs $i\,i$ of the casing and to fit over the cone parts of same substantially as shown in Fig. 1. The part $j$ of the hub of the cup D has a feather connection $k$ with shaft A, whereby said cup is caused to turn in unison with said shaft, but yet allowing of a longitudinal movement of said cup to and from the casing. Furthermore, in the groove $j'$ of said part $j$ is placed the split collar $l$, connected with which are the links $m\,m$, which have a screw-threaded connection with cup E, thereby establishing connection of said cups to enable a simultaneous manipulation thereof.

The lever F has a pivotal connection with the hub $n$ of cup E, as at $o\,o$, Figs. 1 and 2, and engagement with a stationary pin, as at $p$, by which arrangement the cup E is prevented from turning only, while longitudinal movement of this cup can be effected by drawing said lever either toward or from the casing. When the cup E is drawn onto the casing, then the cup D becomes simultaneously relieved, and as a result the casing C remains stationary. In reversing the position of the lever F it is the cup D which clutches the casing, while relief is had from cup E. The cup D causes a turning of the casing in unison with the shaft A, since said cup is secured to said shaft. To prevent undue friction, (caused by the end thrust of casing C,) a bearing $q$, equipped with balls $r$, is provided within the hub $n$ of cup E. (See Fig. 1.) In certain applications a bracket H becomes useful as a support for the shaft B, a means for forming bearing $q$, and furnishing a fulcrum for lever F. Said bearing may be set upon flooring, or it can be attached to beams, as locations may dictate.

A mechanism arranged and equipped as shown and described is applicable not only as a shaft-coupling, but also as a means for driving shafting in either direction and for disconnection of shafting while same is in motion. Since the gears remain in engagement, there is no danger of breaking same in the manipulation of this device. Also since quite a number of teeth take part in the transmission of motion it is evident that the gear-wheels may be small and compact in comparison to the strain or load which they can endure.

Assuming that A is the driving-shaft and that the casing is relieved of both the cups, then no motion can be imparted to shaft B, since the gear $a$ causes the casing to revolve, whereupon the gears $c\ d$ are carried with it and simply turn upon their own axes and around the gear $b$, which state of affairs renders the first-named gear or gears incapable of turning the last-named gear.

If it is desired that the shaft B be driven in the same direction as shaft A, then cup D is set in clutching engagement with the casing, thereby causing the driving of the casing by and through shaft A. The gears become then locked into each other and simply serve in the capacity of a coupling of and for the shafts A and B.

In the instance as shown it is supposed that the cup E is caused to clutch the casing C, which effects a turning of shaft B in reverse direction to shaft A, owing to the fact that the spindle G remains in fixed position, thereby causing a rotation of all the gears, which naturally results in turning the shaft B reversely to the rotation of shaft A.

A reversible driving mechanism of the kind as described is preëminently useful in connection with propeller-shafts of boats, the gearing in motor-vehicles, counter-shafting, &c.

What I claim, and desire to secure by Letters Patent, is—

In a reversible driving mechanism the combination with a driving-shaft a driven shaft, a bevel-gear secured to the facing end of each shaft a set of miter-gears engaging the first-named gears, a spindle upon which said miter-gears are loosely mounted and a double cone-casing consisting of halves which are held in journaled connection with said shafts by said spindle, of a sleeve end thrust bearing, cone-cups adapted to clutch over said casing, adjustable links connecting said cups and a suitably-supported shifting lever for said cups, one of the latter having its hub fitting over the sleeve of said bearing to retain antifriction-balls for said cone-casing and also affording an outside connection with said shifting lever and the other cup having a feathered connection with its shaft, and said balls, all constructed and arranged substantially as and for the purpose set forth.

Signed by me at Cleveland, Ohio, this 16th day of September, 1899.

CHARLES W. DE MOOY.

Witnesses:
BERNH. F. EIBLER,
ARTHUR R. BULLOCK.